(12) United States Patent
Bi et al.

(10) Patent No.: US 9,838,262 B2
(45) Date of Patent: Dec. 5, 2017

(54) METHOD, DEVICE, SYSTEM FOR DETECTING DATA LINK, CONTROLLER AND GATEWAY

(71) Applicant: ZTE Corporation, Shenzhen (CN)

(72) Inventors: Yifeng Bi, Shenzhen (CN); Jing Wang, Shenzhen (CN); Na Zhou, Shenzen (CN); Jun Wang, Shenzen (CN)

(73) Assignee: XI'AN ZHINGXING NEW SOFTWARE CO., LTD., Xi'an (CN)

( * ) Notice: Subject to any disclaimer, the term of this patent is extended or adjusted under 35 U.S.C. 154(b) by 19 days.

(21) Appl. No.: 14/911,018

(22) PCT Filed: May 21, 2014

(86) PCT No.: PCT/CN2014/078048
§ 371 (c)(1),
(2) Date: Feb. 8, 2016

(87) PCT Pub. No.: WO2015/021799
PCT Pub. Date: Feb. 19, 2015

(65) Prior Publication Data
US 2016/0191327 A1    Jun. 30, 2016

(30) Foreign Application Priority Data
Aug. 13, 2013   (CN) .......................... 2013 1 0351284

(51) Int. Cl.
*H04L 12/24*   (2006.01)
*H04L 12/751*   (2013.01)
(Continued)

(52) U.S. Cl.
CPC .......... *H04L 41/12* (2013.01); *H04L 12/4633* (2013.01); *H04L 29/12575* (2013.01); *H04L 45/02* (2013.01)

(58) Field of Classification Search
CPC ................. H04L 41/12; H04L 12/4633; H04L 29/12575; H04L 45/02
(Continued)

(56) References Cited

U.S. PATENT DOCUMENTS 7,937,492 B1 *   5/2011   Kompella ............... H04L 45/22
370/351
2003/0081607 A1 *   5/2003   Kavanagh ........... H04L 63/0227
370/392

(Continued)

FOREIGN PATENT DOCUMENTS

CN    102685006 A    9/2012
CN    103001887 A    3/2013

OTHER PUBLICATIONS

International Search Repot for corresponding application PCT/CN2014/078048 filed on May 21, 2014; dated Aug. 26, 2014.
(Continued)

Primary Examiner — Christine Ng
(74) Attorney, Agent, or Firm — Cantor Colburn LLP (57) ABSTRACT

Disclosed are a method, device, system for detecting a data link, controller, and gateway. The method comprises: an SDN controller sends a GTP request message to a first UGW, and instructs the first UGW to send the GTP request message to another GTP endpoint in a GTP user plane signaling format; the SDN controller receives a GTP response message from the first UGW, and detects a data link between the first UGW and the another GTP endpoint according to the GTP response message, the GTP response message being corresponding to the GTP request message. The disclosure solves the problem in the prior art that logic of a user plane and logic of a control plane are unclear during detection of
(Continued)

a data link between GTP endpoints, thereby improving the clarity of the logic of the user plane and the clarity of the logic of the control plane.

17 Claims, 6 Drawing Sheets

(51) Int. Cl.
  *H04L 29/12* (2006.01)
  *H04L 12/46* (2006.01)
(58) Field of Classification Search
  USPC .................. 370/252, 328, 338, 401, 469
  See application file for complete search history.

(56) References Cited

U.S. PATENT DOCUMENTS

| | | | |
|---|---|---|---|
| 2010/0118724 A1* | 5/2010 | Hirsch | ............... H04L 12/2697 370/252 |
| 2011/0286324 A1 | 11/2011 | Bellagamba | |
| 2011/0307628 A1* | 12/2011 | Chiba | ................... H04L 49/355 709/241 |
| 2012/0300615 A1 | 11/2012 | Kempf | |
| 2013/0054761 A1 | 2/2013 | Kempf et al. | |
| 2015/0036505 A1* | 2/2015 | Sparks | ................... H04L 47/11 370/236 |

OTHER PUBLICATIONS

"SPARC ICT-258457 Split Architecture for 1-15; Large Scale Wide Area Networks. Deliverable D3.3", 1• December 2e11 (2ell-12-el), XPe55139597, Retrieved from the Internet: URL:http://www.fp7-sparc.eu/assets/deliverables/SPARCD3.3 Split Architecture for Large Scale Wide Area Networks.pdf—[retrieved on 2e14-09-II]; * 5.3 Opeartions and Maintenance (OAM) tools; p. 56-p. 61.
Supplementary European Search Repot for corresponding application EP14836741; dated May 27, 2016; pp. 11.
Katz D Ward: Bidirectional Forwarding Detection (BFD); rfc5880. txt; Internet Engineering Task Force, IETF; Standard, Internet Society (ISOC) 4, Rue Des Falaises CH—1205 Geneva, Switzerland; Jun. 1, 2010 (Jun. 1, 2010), pp. 1-49, XP015070820, [retrieved on Jun. 1, 2010].

* cited by examiner

METHOD, DEVICE, SYSTEM FOR DETECTING DATA LINK, CONTROLLER AND GATEWAY

TECHNICAL FIELD

The disclosure relates to the field of communications, and in particular to a method, device, system for detecting a data link, controller, and gateway.

BACKGROUND

An OpenFlow (OF for short) protocol is a forwarding/control separation protocol proposed by Stanford University in the United States at 2008. An external control plane entity adopts the OF protocol to control a forwarding plane device to implement various forwarding logics, while the main function of the forwarding plane device is to execute controlled forwarding according to a flow table issued by an OF controller. The OF protocol is further evolved to become a software defined network (SDN for short) technique, i.e., various complicated network applications may be implemented adopting software programming at a control plane, e.g., an SDN is configured to implement an evolved packet system (EPS for short)/general packet radio service (GPRS) network. The EPS network is a 3rd generation partnership project (3GPP for short) defined 4th generation mobile communication network, and the GPRS network is a 3GPP defined 3rd generation mobile communications network.

Figure 1:
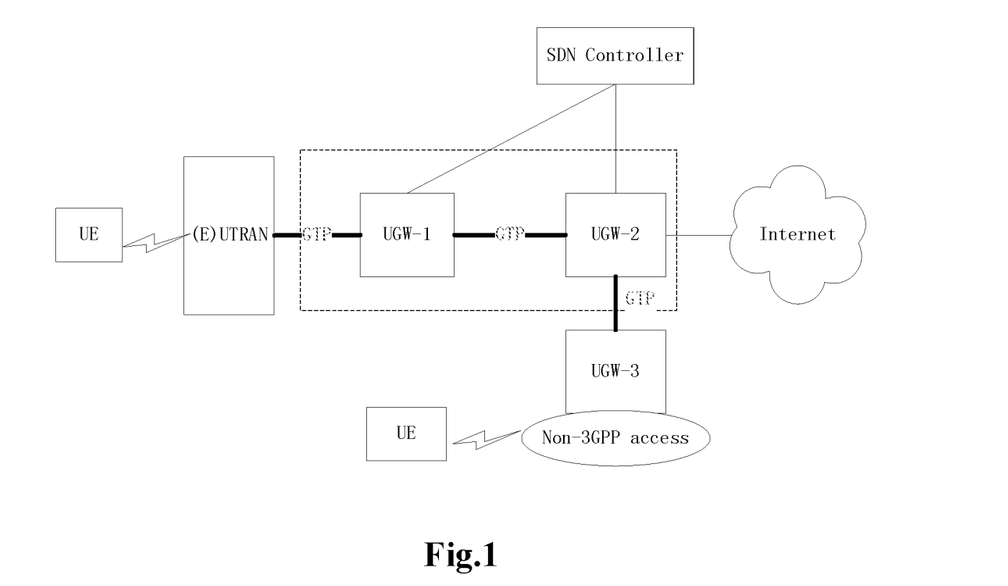
FIG. 1 is an architecture diagram where an SDN is employed to implement an EPS/GPRS network according to the relevant art.

FIG. 1 is an architecture diagram where an SDN is employed to implement an EPS/GPRS network according to the relevant art. The architecture mainly comprises User Equipment (UE for short), a(n) (evolved) Universal Terrestrial Radio Access Network ((E)UTRAN for short), a core network, a controller, and an internet, wherein the UE is a communication terminal; the (E)UTRAN is a radio access network, and the inside of the (E)UTRAN is composed of an evolved NodeB (eNodeB) or a NodeB; and the core network, i.e., a software defined Evolved Packet Core (EPC for short) network, is a core network portion of the EPS, and all the Unified Gateways (UGWs for short) in the core network are general gateway devices, and the role thereof is controlled by control signaling from an SDN controller. For example, with regard to an IP connection of certain UE, a unified gateway UGW-1 serves as a serving gateway (SGW for short) or a serving GPRS support node (SGSN for short); a UGW2 serves as a packet data network gateway (P-GW for short) or a gateway GPRS support node (GGSN for short); and a UGW3 serves as a non-3GPP access gateway or an evolved packet data gateway (ePDG for short). In such way, between the (E)UTRAN and the UGW-1, between the UGW-1 and the UGW-2, and between the UGW-2 and the UGW-3 are all interfaces based on a GPRS tunnel protocol-user plane (GTP-U for short) protocol. In other words, the GTP-U protocol must be supported between a UGW and an (e)NB, between a UGW and a UGW, or between a UGW and a traditional GTP network element.

Figure 2:
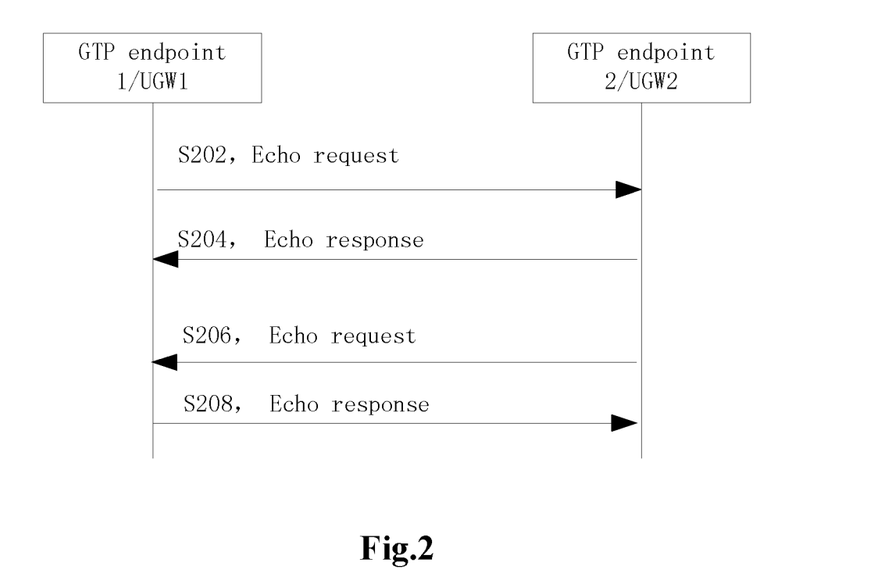
FIG. 2 is a flowchart of GTU-U session keep-alive according to the relevant art.

The GPRS tunnel protocol (GTP for short) is a set of protocols defined by 3GPP, which is divided into a GPRS tunnel protocol-controller plane (GTP-C for short) protocol and a user plane protocol GTP-U. The GTP-U is a protocol used for data encapsulation and forwarding between gateways. In addition, the GTP-U further has a set of self session detection mechanism: detecting a path and detecting a path state by sending a GTP-U Echo Request message and Echo Response message to the opposite end, and the specific flow is as shown in FIG. 2, comprising the steps as follows:

step S202, a UGW1 sends an echo request message to a UGW2.

One UGW, such as the UGW 1, serves as a GTP endpoint 1 to send an echo request message to a UGW which serves as a GTP endpoint 2, such as the UGW2, and the UGW 1 starts a timer t1 after sending the message.

A target address of the echo request message is an address of the GTP endpoint 2; a destination port number of a user datagram protocol (UDP for short) is set as 2152; a tunnel endpoint identifier (TEID for short) is all-zero; a source address is an address of the UGW1 itself; and a source port number is any configured port. A sequence number (SN for short) is an initial value, such as 0 or adding 1 to the sequence number of the last echo request message.

Step S204, the UGW2 sends an Echo response message to the UGW1.

The GTP endpoint 2, i.e., the UGW2, after receiving the echo request message, sends an Echo Response message to the opposite end, wherein a target address of the Echo Response message is an address of the GTP endpoint 1, a destination port number of the UDP is set as the source port number of the echo request message in step S202, the TEID is all-zero, a source address is an address of the UGW2 itself, a source port number is the destination port number of the echo request message in step S202, and an SN is the SN of the echo request message.

The GTP endpoint 1, i.e., the UGW1, after receiving the Echo Response message, ends the timer t1, and starts a timer t2.

If the timer t1 times out but the Echo Response message is not received, the GTP endpoint 1 may re-send the echo request message, the format and content of the message being the same as those of the echo request message sent at the first time, and start the timer t1 again. If the echo response message has not been received after t1 times out again, then the operation above is repeated. After operations for N1 times, if there is still no echo response message received, then it is considered that this link is blocked, and the GTP endpoint 1 performs a relevant operation locally, such as deleting GTP context.

After the timer t2 times out, the GTP endpoint 1 may send another echo request message, the SN of the message equals to the SN of the echo request message of the last time add 1, and start the timer t1. Steps S202 and S204 above are repeated in subsequent operations.

step S206, the UGW2 sends an echo request message to the UGW1.

The GTP endpoint 2, i.e., the UGW2, sends an echo request message to the GTP endpoint 2, i.e., the UGW1.

step S208, the UGW1 sends an echo response message to the UGW2.

The GTP endpoint 1, i.e., the UGW 1, receives the echo request message and responds with an echo response message. The specific operations are the same as step S202 and step S204, while the difference lies in that the GTP endpoint 1 exchanges the role with the GTP endpoint 2.

The GTP endpoint 1 and the GTP endpoint 2 respectively detect respective echo request and echo response message pairs, and the message pair detected in step S202 and step S204 has no dependent relationship with the message pair detected in step S204 and step S206.

The GTP principle introduced above is applicable to the existing gateway/NodeB of 3GPP, and the GTP endpoint generally refers to any network element of an eNB, an NB, an SGW, a P-GW, an ePDG; a credit access network gateway, an SGSN, or GGSN, etc. in a 3GPP network. When an SDN is configured to implement an EPC, logics related to a control plane are all implemented on an SDN controller. A UGW, serving as a forwarding device, only has a forwarding function and a very simple logical control function. Therefore, how to implement GTP session (referring in particular to a GTP-U) detection, i.e., how to use an echo request message and an echo response message, is a problem to be solved.

With regard to the problem in the relevant art that logic of a user plane and logic of a control plane are unclear during detection of a data link between GTP endpoints, there is no effective solution proposed at present.

SUMMARY

The embodiments of the disclosure provide a method, device and system for detecting a data link, controller, and gateway, so as to at least solve the problem above.

According to one aspect of the embodiments of the disclosure, a method for detecting a data link is provided, comprising: an SDN controller sending a GTP request message to a first UGW, and instructing the first UGW to send the GTP request message to another GTP endpoint in a GTP user plane signaling format; the SDN controller receiving a GTP response message from the first UGW, and detecting the data link between the first UGW and the another GTP endpoint according to the GTP response message, the GTP response message being corresponding to the GTP request message.

Preferably, the SDN controller sending the GTP request message to the first UGW, and instructing the first UGW to send the GTP request message to the another GTP endpoint in the GTP user plane signaling format comprises: the SDN controller sending a Packet-out message of an OPENFLOW protocol to the first UGW, the GTP request message being borne on the Packet-out message; and the SDN controller instructing, via the Packet-out message, the first UGW to send the GTP request message to the another GTP endpoint in the GTP user plane signaling format.

Preferably, in the case where the another GTP endpoint is a second UGW, the GTP response message is generated by the SDN controller according to the GTP request message which is borne on a Packet-in message of an OPENFLOW protocol and is forwarded by the second UGW, and is sent to the SDN controller via the second UGW and the first UGW; and in the case where the another GTP endpoint is a traditional GTP endpoint, the GTP response message is generated by the traditional GTP endpoint according to the GTP request message, and is sent to the SDN controller via the first UGW.

Preferably, the GTP response message is sent in the GTP user plane signaling format when being forwarded to the first UGW via the second UGW or being sent to the first UGW by the traditional GTP endpoint.

Preferably, the SDN controller detecting the data link between the first UGW and the another GTP endpoint according to the GTP response message comprises at least one of the following: within a pre-set time threshold, based on that the SDN controller has received the GTP response message, determining that the data link between the first UGW and the another GTP endpoint is normal; and within a pre-set time threshold, based on that the SDN controller has not received the GTP response message, and the GTP response message has not yet been received after the SDN controller performs a pre-set number of retry operations, determining that the data link between the first UGW and the another GTP endpoint is abnormal.

Preferably, based on that the GTP request message and/or the GTP response message are/is sent by the SDN controller to the first UGW, the GTP request message and/or the GTP response message are/is borne on a Packet-out message of an OpenFlow protocol, and based on that the GTP request message and/or the GTP response message are/is sent by the first UGW to the SDN controller, the GTP request message and/or the GTP response message are/is borne on a Packet-in message; and/or the GTP request message and/or the GTP response message are/is transmitted in the GTP user plane signaling format when the GTP request message and/or the GTP response message are/is transmitted between the first UGW and the another GTP endpoint.

Preferably, the GTP user plane signaling is an echo request message and/or echo response message in a standard GTP format.

Preferably, the GTP request message generated by the SDN controller is generated according to context information of a GTP user plane; and the GTP response message generated by the SDN controller is generated according to the GTP request message and context information of a GTP user plane.

Preferably, in the case where the another GTP endpoint is a second UGW, the method further comprises: the SDN controller sending a second GTP request message to the second UGW, and instructing the second UGW to send the second GTP request message to the first UGW in a GTP user plane signaling format; and the SDN controller receiving a second GTP response message from the second UGW, and detecting the data link between the first UGW and the another GTP endpoint according to the second GTP response message, wherein the second GTP response message corresponds to the second GTP request message.

According to one aspect of an embodiment of the disclosure, a method for detecting a data link is provided, comprising: a first UGW receiving a GTP request message sent from an SDN controller; and the first UGW sending the GTP request message to another GTP endpoint in a GTP user plane signaling format according to an instruction of the SDN controller, and forwarding the GTP response message to the SDN controller, wherein the GTP response message corresponds to the GTP request message and is used for detecting the data link between the first UGW and the another GTP endpoint.

Preferably, in the case where the another GTP endpoint is a second UGW, the GTP response message is generated by the SDN controller according to the GTP request message which is borne on a Packet-in message of an OPENFLOW protocol and is forwarded by the second UGW, and is sent to the SDN controller via the second UGW and the first UGW; and in the case where the another GTP endpoint is a traditional GTP endpoint, the GTP response message is generated by the traditional GTP endpoint according to the GTP response message, and is sent to the SDN controller via the first UGW.

Preferably, based on that the GTP request message and/or the GTP response message are/is sent by the SDN controller to the first UGW, the GTP request message and/or the GTP response message are/is borne on a Packet-out message of an OPENFLOW protocol, and based on that the GTP request message and/or the GTP response message are/is sent by the first UGW to the SDN controller, the GTP request message and/or the GTP response message are/is borne on a Packet-in message; and/or the GTP request message and/or the GTP response message are/is transmitted in the GTP user plane signaling format when the GTP request message and/or the GTP response message are/is transmitted between the first UGW and the another GTP endpoint.

Preferably, the GTP user plane signaling is an echo request message and/or echo response message in a standard GTP format.

Preferably, the GTP request message generated by the SDN controller is generated according to context information of a GTP user plane; and the GTP response message generated by the SDN controller is generated according to the GTP request message and context information of a GTP user plane.

According to another aspect of an embodiment of the disclosure, a device for detecting a data link is provided, comprising: a sending component configured to send a GTP request message to a first UGW, and instruct the first UGW to send the GTP request message to another GTP endpoint in a GTP user plane signaling format; and a detection component configured to receive a GTP response message from the first UGW, and detect a data link between the first UGW and the another GTP endpoint according to the GTP response message, the GTP response message being corresponding to the GTP request message.

According to another aspect of an embodiment of the disclosure, a device for detecting a data link is provided, comprising: a receiving component configured to receive a GTP request message sent from an SDN controller; and a forwarding component configured to send the GTP request message to another GTP endpoint in a GTP user plane signaling format according to an instruction of the SDN controller, and send the GTP response message to the SDN controller, wherein the GTP response message corresponds to the GTP request message and is used for detecting a data link between the first UGW and the another GTP endpoint.

According to yet another aspect of an embodiment of the disclosure, a controller is provided, comprising the detection device as claimed in point fifteen above, and the controller is an SDN controller.

According to yet another aspect of an embodiment of the disclosure, a gateway is provided, comprising the detection device as claimed in point sixteen above, and the gateway is a unified gateway (UGW).

According to still another aspect of an embodiment of the disclosure, a system for detecting a data link is provided, comprising the controller as claimed in point seventeen above and at least one gateway as claimed in the solution of point eighteen.

By means of the embodiments of the disclosure, an SDN controller is configured to send a GTP request message to a first UGW, and instruct the first UGW to send the GTP request message to another GTP endpoint in a GTP user plane signaling format; and the SDN controller receives a GTP response message from the first UGW, and detects a data link between the first UGW and the another GTP endpoint according to the GTP response message, the GTP response message being corresponding to the GTP request message. The problem in the relevant art that logic of a user plane and logic of a control plane are unclear during detection of the data link between GTP endpoints is solved, thereby achieving the effect that the logic of the user plane and the logic of the control plane improve the quality of data link detection between GTP endpoints.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF THE EMBODIMENTS

The disclosure is described below in detail by reference to the accompanying drawings in conjunction with embodiments. Note that, the embodiments of the disclosure and the features of the embodiments can be combined with each other if there is no conflict.

Figure 3:
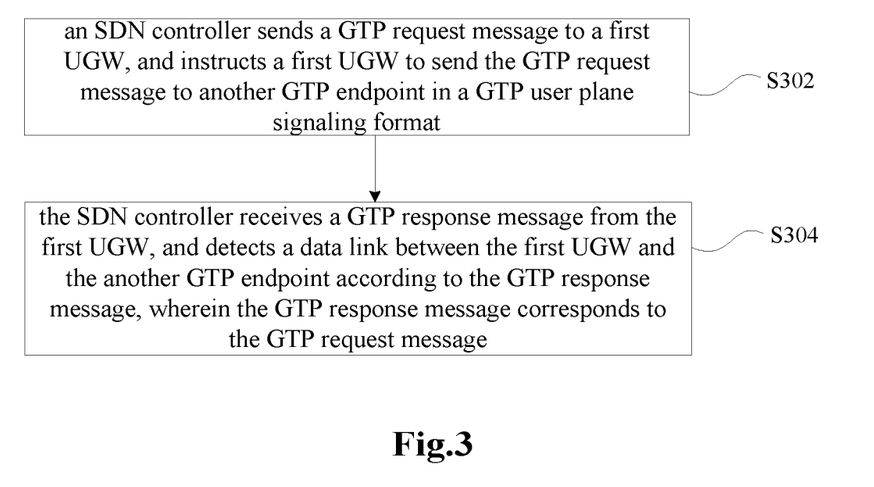
FIG. 3 is a flowchart of a method for detecting a data link according to embodiment I of the disclosure.

An embodiment of the disclosure provides a method for detecting a data link. FIG. 3 is a flowchart I of a method for detecting a data link according to embodiment I of the disclosure. As shown in FIG. 3, the flow comprises the steps as follows:

step S302, an SDN controller sends a GTP request message to a first UGW, and instructs a first UGW to send the GTP request message to another GTP endpoint in a GTP user plane signaling format; and step S304, the SDN controller receives a GTP response message from the first UGW, and detects a data link between the first UGW and the another GTP endpoint according to the GTP response message, wherein the GTP response message corresponds to the GTP request message.

By means of the steps above, the practice in the relevant art that a UGW saves control plane data, and generates user plane data according to the stored control plane data, thereby detecting a data link according to the user plane data is changed. The problem in the prior art that logic of a user plane and logic of a control plane are unclear during detection of a data link between GTP endpoints is solved, thereby improving the clarity of the logic of the user plane and the clarity of the logic of the control plane.

The step of the SDN controller sending the GTP request message to the first UGW, and instructing the first UGW to send the GTP request message to the another GTP endpoint in the GTP user plane signaling format may comprise: the SDN controller sending a PO message of an OPENFLOW protocol to the first UGW, the GTP request message being borne on the PO message; and the SDN controller instructs the first UGW to forward the GTP request message to the another GTP endpoint in the GTP user plane signaling format via the PO message. By means of the steps above, the first UGW does not need to save any data for constructing the GTP request message, but only needs to parse out the GTP request message from a PI message after receiving the PI message from the SDN controller according to the instruction of the PI message, and then forward the parsed GTP message to the GTP endpoint in the GTP user plane signaling format.

The data link detection generally has two detection results, one is determining that the data link between the UGW and the another GTP endpoint is normal if the SDN controller has received the GTP response message within a pre-set time threshold; and the other is determining that the data link between the UGW and the another GTP endpoint is abnormal if the SDN controller has not received the GTP response message within a pre-set time threshold and after the SDN has repeated the operation of sending the GTP request message for N times, the GTP response message has not yet been received. By means of the steps above, the state of the data link between the first UGW and the another GTP endpoint may be acquired.

The another GTP endpoint may be a traditional GTP endpoint, and may also be a UGW. In the case where the another GTP endpoint is a second UGW, the GTP response message is generated by the SDN controller according to the GTP request message forwarded by the second UGW, and is sent to the SDN controller via the second UGW and the first UGW; and in the case where the another GTP endpoint is a traditional GTP endpoint, the GTP response message is generated by the traditional GTP endpoint according to the GTP request message, and is sent to the SDN controller via the first UGW. By means of the steps above, the GTP response message may be returned to the SDN controller, so as to determine the state of the data link.

The GTP response message is sent in the GTP user plane signaling format when being forwarded to the first UGW via the second UGW or being sent to the first UGW by the traditional GTP endpoint. By means of the steps above, the second UGW merely parses out the GTP response message from the PO message sent from the SDN controller, and forwards same to the first UGW in the GTP user plane signaling format which is a standard GTP format, thereby alleviating the load of the second UGW.

When being transmitted between the SDN controller and the first UGW, the GTP request message and/or the GTP response message are/is borne on a PI message and/or PO message of an OpenFlow protocol; and/or when being transmitted between the first UGW and the another GTP endpoint, the GTP request message and/or the GTP response message are/is borne on the user plane signaling. The user plane signaling is an echo request message and/or echo response message in a standard GTP format. Actually, in addition to the case where the message, which is transmitted between the SDN controller and the at least one UGW, can be borne on an OF message, such as a PI and PO message, It can also be borne on other OF messages, or on a newly added message, or on other non-OF protocol messages, e.g., a southbound (SB for short) protocol, an OVSDB (OVS database) protocol, an OF configuration (OF-config) protocol, a path computation element communication protocol (PCEP for short), a border gateway protocol (BGP for short), etc. can all extensively support the GTP request message and/or GTP response message between the SDN controller and the first UGW, while these methods all fall within the coverage area of the embodiments of the disclosure.

Figure 4:
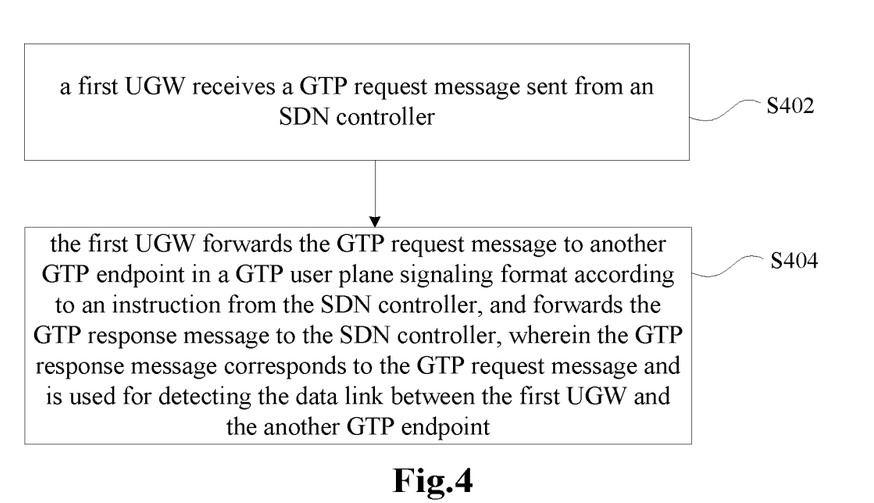
FIG. 4 is a flowchart of a method for detecting a data link according to embodiment II of the disclosure.

One embodiment of the disclosure further provides a method for detecting a data link. FIG. 4 is a flowchart of a method for detecting a data link according to embodiment II of the disclosure. As shown in FIG. 4, the flow comprises the steps as follows:

step S402, a first UGW receives a GTP request message sent from an SDN controller; and step S404, the first UGW forwards the GTP request message to another GTP endpoint in a GTP user plane signaling format according to an instruction from the SDN controller, and forwards the GTP response message to the SDN controller, wherein the GTP response message corresponds to the GTP request message and is used for detecting the data link between the first UGW and the another GTP endpoint.

Preferably, in the case where the another GTP endpoint is a second UGW, the GTP response message is generated by the SDN controller according to the GTP request message forwarded by the second UGW, and is sent to the SDN controller via the second UGW and the first UGW; and in the case where the another GTP endpoint is a traditional GTP endpoint, the GTP response message is generated by the traditional GTP endpoint according to the GTP response message, and is sent to the SDN controller via the first UGW.

Preferably, when being transmitted between the SDN controller and the first UGW, the GTP request message and/or the GTP response message are/is borne on a PI message and/or PO message of an OpenFlow protocol; and/or when being transmitted between the first UGW and the another GTP endpoint, the GTP request message and/or the GTP response message are/is borne on the user plane signaling.

Preferably, the user plane signaling is an echo request message and/or echo response message in a standard GTP format.

Preferably, the GTP request message generated by the SDN controller and/or the GTP response message generated by the SDN controller are/is generated according to context information of a GTP user plane.

Figure 5:
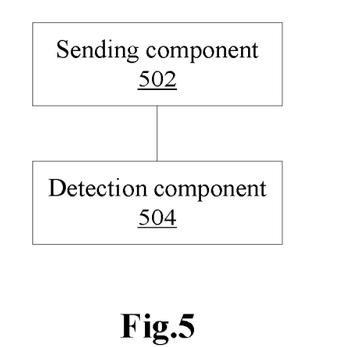
FIG. 5 is a structural schematic diagram of a device for detecting a data link according to embodiment III of the disclosure.

One embodiment of the disclosure further provides a device I for detecting a data link. FIG. 5 is a structural schematic diagram of a device I for detecting a data link according to embodiment III of the disclosure. As shown in FIG. 5, the device comprises:

a sending component 502 configured to send a GTP request message to a first UGW, and instruct the first UGW to forward the GTP request message to another GTP endpoint in a GTP user plane signaling format; and a detection component 504 configured to detect a data link between the first UGW and the another GTP endpoint according to the GTP response message, wherein the GTP response message corresponds to the GTP request message.

Figure 6:
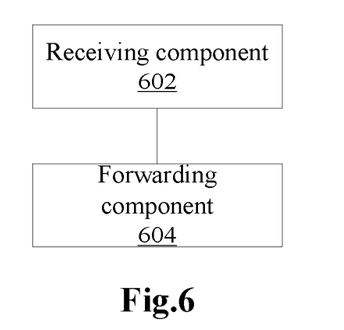
FIG. 6 is a structural schematic diagram of a second device for detecting a data link according to embodiment IV of the disclosure.

One embodiment of the disclosure further provides a device II for detecting a data link. FIG. 6 is a structural schematic diagram of a device II for detecting a data link according to embodiment IV of the disclosure. As shown in FIG. 6, the device comprises:

a receiving component 602 configured to receive a GTP request message sent from a software defined network (SDN) controller; and a forwarding component 604 configured to forward the GTP request message to another GTP endpoint in a GTP user plane signaling format according to an instruction of the SDN controller, and forward the GTP response message to the SDN controller, wherein the GTP response message corresponds to the GTP request message and is used for detecting a data link between the first UGW and the another GTP endpoint.

One embodiment of the disclosure further provides a controller, the controller comprising the device I for detecting the data link above, and the controller is an SDN controller.

One embodiment of the disclosure further provides a gateway, the gateway comprising the device II for detecting the data link above, and the gateway is a UGW.

Figure 7:
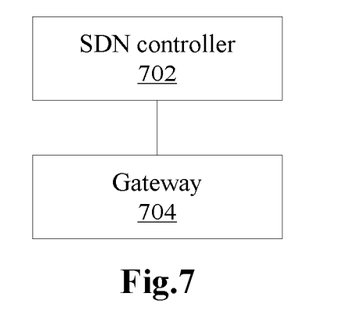
FIG. 7 is a structural schematic diagram of a system for detecting a data link according to embodiment V of the disclosure.

One embodiment of the disclosure further provides a system for detecting a data link. FIG. 7 is a structural schematic diagram of a system for detecting a data link according to embodiment V of the disclosure. As shown in FIG. 7, the system comprises the controller 702 above and at least one gateway 704 above.

Preferred Embodiment I

Figure 8:
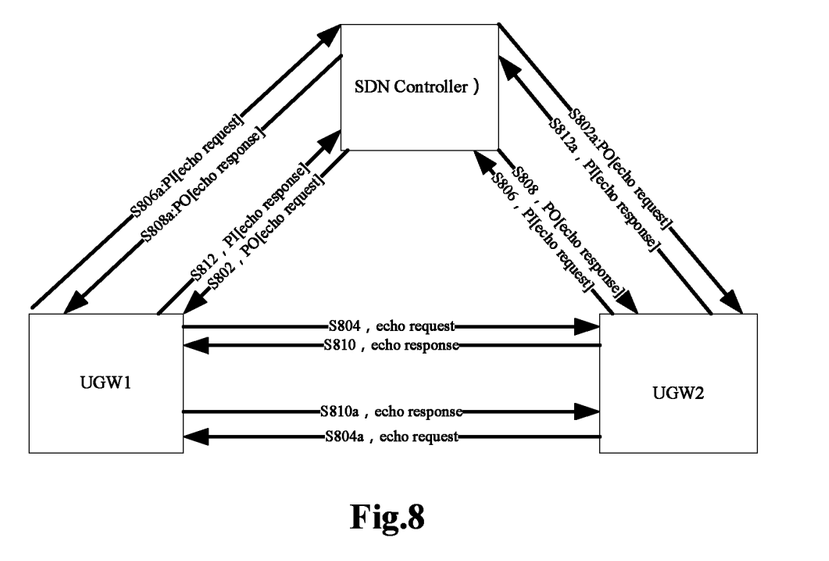
FIG. 8 is a flowchart of a method for detecting a data link according to preferred embodiment I of the disclosure.

FIG. 8 is a flowchart of a method for detecting a data link according to preferred embodiment I of the disclosure. Network elements for implementing the method for detecting the data link mainly comprise an SDN controller, a UGW1 and a UGW2, wherein the UGW1 is equivalent to a first UGW, the UGW2 is equivalent to a GTP endpoint, and the GTP endpoint is a UGW, i.e., the GTP endpoint is a second UGW. In the embodiment, the SDN controller maintains a state machine of an echo request message and a state machine of an echo response message and at the same time also maintains context information of a GTP user plane. The context information comprises a clock t1 and a corresponding maximum time interval T1, a clock t2 and a corresponding maximum time interval T2, a counter n1 and a corresponding maximum number of times N1, and other possible context information, such as a sequence number (SN for short). The maximum value T1 of the timer t1 represents a maximum time value of waiting for an echo response message after the SDN controller sends an echo request message, and is defined as T3-RESPONSE in the standard, and is represented by T1 in the present application; the maximum value N1 of the counter n1 represents the maximum number of times the SDN controller re-sends the echo request message, and is defined as N3-REQUESTS in the standard, and is represented by N1 herein; and the maximum value T2 of the timer t2 represents a sending interval time of the echo request message. As shown in FIG. 8, the flow comprises the following steps:

step S802-806, an SDN controller sends out a GTP echo request message, the GTP echo request message is borne on a PO message of an OF protocol, and the GTP echo request message is returned back to the SDN controller at last via a path of SDN controller→UGW1→UGW2→SDN controller, wherein the GTP echo request message is equivalent to a GTP request message.

S802: an SDN controller generates a GTP echo request message according to context information of a GTP user plane, and the GTP echo request message is encapsulated in a PO message in an OF protocol and is sent to a UGW1. When the echo request message is encapsulated in the PO message, a standard echo request message/echo response message is encapsulated in a domain unit8_t data[0], while a domain of p_action_header actions[0] identifies that a specific operation is forwarding out (Packet-out) the echo request message/echo response message encapsulated in the domain unit8_t data[0].

S804, the UGW1 fetches the GTP echo request message according to an operation instruction in the PO message, and sends the message to a UGW2 in a standard GTP-U format.

S806, after having received the echo request message sent from the UGW1, the UGW2 matches a data packet to the echo request according to a match domain in a flow table on the UGW2, and encapsulates the echo request message in a PI message according to an operation instruction in the flow table, and then sends same to the SDN controller. When the echo request message is encapsulated in the PI message, a standard echo request/echo response message is encapsulated in a domain unit8_t data[0], while a domain unit8_t reason identifies that an action after receiving the message is forwarding (Packet-In), i.e., sending same to the SDN controller.

Step S808-812, after receiving the echo request message, the SDN controller generates an echo response message, the echo response message arriving at the SDN controller at last via a path of SDN controller→UGW2→UGW1→SDN controller.

S808: the SDN controller is triggered according to the received echo request message to generate an echo response message, and encapsulates the echo response message in a PO message of the OF protocol and sends same to the UGW2. The format that the echo response message is encapsulated in the PO message is as mentioned above, and will not be described redundantly herein.

S810, the UGW2 fetches the GTP echo response message according to an operation instruction in the PO message, and sends the GTP echo response message to the UGW1 in a standard GTP-U format, i.e., a GTP user plane signaling format.

S812, after having received the echo response message sent from the UGW2, the UGW1 matches a data packet to the echo response according to a match domain in a flow table on the UGW1, and encapsulates the echo response message in a PI message according to an operation instruction in the flow table, and then sends same to the SDN controller. The format that the echo response message is encapsulated in the PI message is as mentioned above, and will not be described redundantly herein.

In the relevant art, i.e., as the GTP maintenance mechanism described in FIG. 2, the GTP echo request message and echo response message are bi-directionally sent to the opposite ends respectively from two endpoints of the GTP; therefore, in the embodiment, the SDN controller also needs to send the PI message, in which the echo request message is encapsulated, to the UGW2, the message returning back to the DN controller at last in operations similar to steps S802-806, i.e., steps S802a-806a. Likewise, the SDN controller also needs to respond with the echo response message via a path of UGW1→UGW2, and the message is returned back to the SDN controller at last in a format similar to steps S808-812, i.e., steps S808a-812a.

According to the operations above, a normal operation of GTP session keep-alive is accomplished. Subsequently, the SDN controller may initiate the above operations once respectively at two GTP endpoints according to the timer t2 every fixed time interval (e.g., 60 s) so as to ensure the active state of the GTP link.

Preferred Embodiment II

Figure 9:
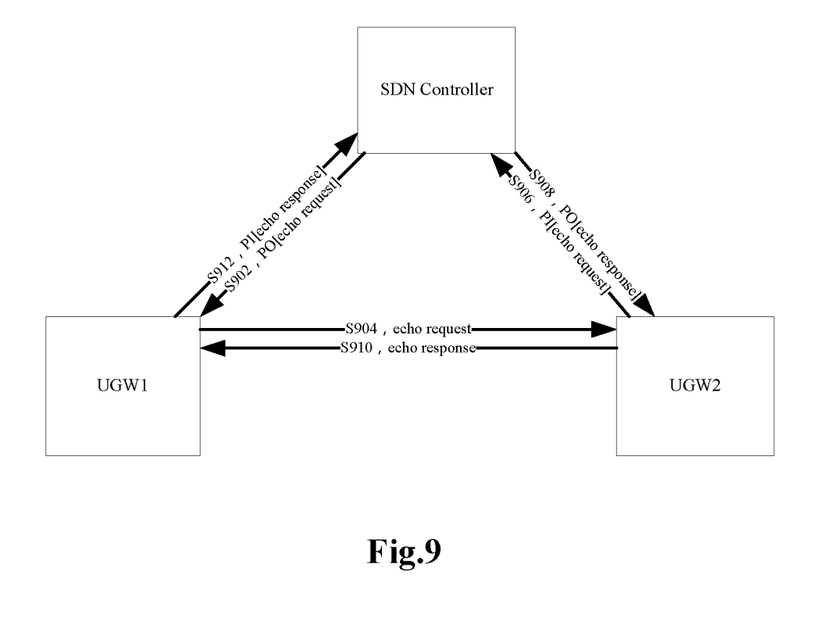
FIG. 9 is a flowchart of a method for detecting a data link according to preferred embodiment II of the disclosure.

FIG. 9 is a flowchart of a method for detecting a data link according to preferred embodiment II of the disclosure. The method is an optimization of the method as shown in preferred embodiment I.

In the relevant art, GTP keep-alive is to keep a GTP link alive by bi-directionally sending an echo request message/echo response message, and the reason thereof is that two GTP endpoints are two different endpoints. In consideration with the current scenario, the point for generating, sending and receiving the echo request/echo response message is the same point, i.e., the SDN controller. Therefore, as long as the SDN controller has received the message sent therefrom, the link is alive.

Therefore, the message in one direction can be omitted while the message in the other direction is remained only on the basis of preferred embodiment I, i.e., as shown in FIG. 9, only comprising the steps as follows:

step S902-906, an SDN controller sends out an echo request message, the echo request message is returned back to the SDN controller at last via a path of SDN controller→UGW1→UGW2→SDN controller.

Step S908-912, after receiving the echo request message, the SDN controller generates an echo response message, the echo response message arriving at the SDN controller at last via a path of SDN controller→UGW2→UGW1→SDN controller.

The steps above are the same as steps S802-812 in preferred embodiment I, and will not be described redundantly herein. However, in comparison with preferred embodiment I, in the embodiment, steps S8102a-812a in the preferred embodiment are omitted, but this can likewise have the function of GTP link keep-alive.

Preferred Embodiment III

Figure 10:
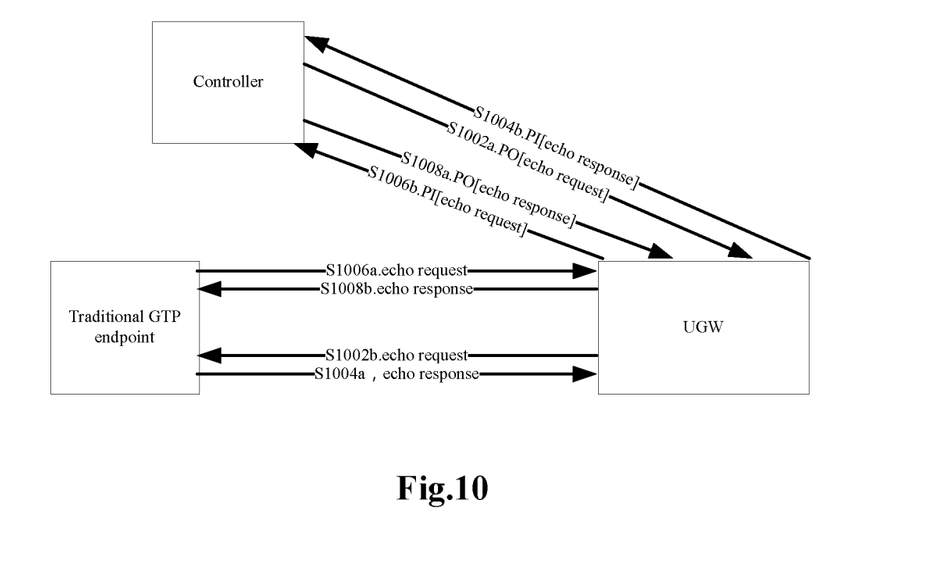
FIG. 10 is a flowchart of a method for detecting a data link according to preferred embodiment II of the disclosure.

FIG. 10 is a flowchart of a method for detecting a data link according to preferred embodiment II of the disclosure. In the embodiment, in two GTP endpoints, one is a traditional GTP endpoint, such as an eNB or a traditional S-GW/PGW, while the other endpoint is a UGW. In such way, the maintenance of the GTP link needs to bi-directionally send an echo request/echo response message for maintenance, rather than uni-directional maintenance as in preferred embodiment II. That is, context information of a GTP user plane on a UGW side is maintained by an SDN controller, and GTP context information of the traditional GTP endpoint is maintained according to the relevant art. The operations of the traditional GTP endpoint, i.e., the message sending between the traditional GTP endpoint and the UGW, can refer to the corresponding description of FIG. 2. The operations of the UGW, i.e., the message between the UGW and the SDN controller, and the operations of the SDN controller, can refer to the corresponding description of FIG. 8, i.e., steps S1002a and S1004b are equivalent to steps S802a and S812a in FIG. 8; step S1006b and step S1008a are equivalent to S806 and S808 in FIG. 8; step S1006a and step S1008b are equivalent to S804 and S810 in FIG. 8; and steps S1002b and S1004a are equivalent to steps S206 and S208 in FIG. 2, which will not be described redundantly herein.

Preferred Embodiment IV

Figure 11:
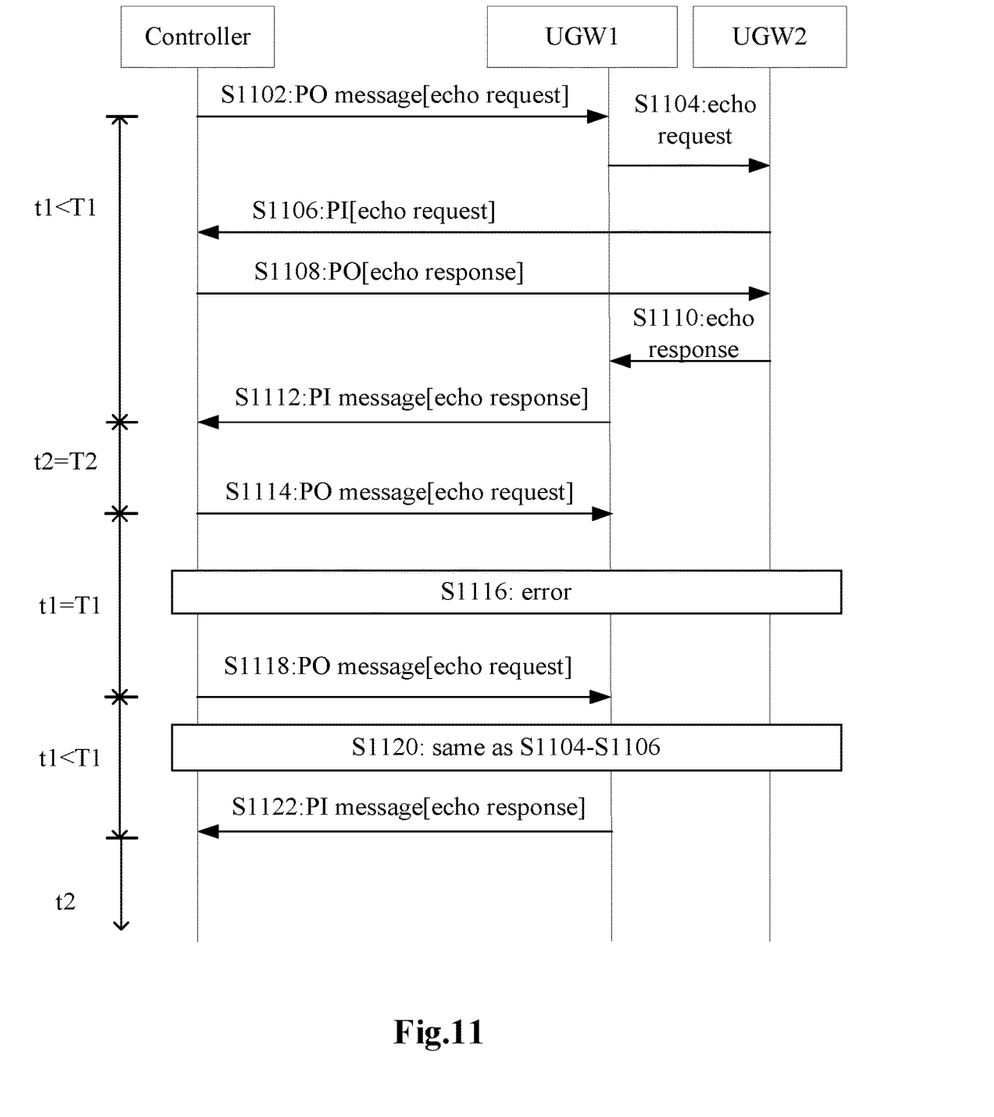
FIG. 11 is a flowchart of a method for detecting a data link according to preferred embodiment IV of the disclosure.

FIG. 11 is a flowchart of a method for detecting a data link according to preferred embodiment IV of the disclosure. As shown in FIG. 11, the flow comprises the steps as follows:

steps S1102-S1112, after sending out an echo request message borne on a PO message, an SDN controller starts a timer t1, and waits for a corresponding echo response message; if the echo response message is received within t1<T1, it represents that the interaction at this time is normal, and the SDN controller starts a timer t2; and when t2=T2, the SDN controller initiates the next interaction, i.e., sending the echo request message again, wherein the echo request message is equivalent to a GTP request message, and the echo response message is equivalent to a GTP response message.

Steps S1114-S1122, after sending the echo request message borne on the PO message, if the SDN controller has not received the corresponding echo response message when t1=T1, then the SDN controller re-sends the echo request message (step S1118), and re-starts the timer t1, and if the corresponding echo response message is received when t1<T1, then it represents that keep-alive is successful, and at the same time enters the next keep-alive, i.e., data link detection; and if the corresponding echo response message has not been received when t1=T1, then the message is re-sent again, and t1 is re-started again . . . if the operations above are executed for N1 times and the echo response message has not yet been received, then the SDN controller considers that message interaction has failed and the link is blocked, and initiates a corresponding operation, such as deleting context information of the GTP user plane.

The SDN controller function in the solution above can be implemented on all network devices such as any server having a computation capability or the SDN controller, such as an X86 server; and the UGW function can be implemented on all network devices such as a server having a routing function or a router or a switch, such as an X86 server, an enhanced common switch.

From the description above, it can be seen that the embodiments of the disclosure achieve the following technical effect: having the effect of improving the clarity of the logic of a user plane and the logic of a control plane, and alleviating the load of the first UGW.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In such way, the disclosure is not restricted to any particular hardware and software combination.

The descriptions above are only the preferable embodiment of the disclosure, which are not used to restrict the disclosure, for those skilled in the art, the disclosure may have various changes and variations. All modifications, equivalents and improvements, which are made within the spirit and principle of the disclosure, should be comprised in the protection scope of the disclosure.

INDUSTRIAL APPLICABILITY

As mentioned above, the method, device, system for detecting the data link, controller, and gateway provided in the embodiments of the disclosure have the following beneficial effects: having the effect of improving the clarity of the logic of a user plane and the logic of a control plane, and alleviating the load of the first UGW.

What is claimed is:

1. A method for detecting a data link, comprising:
a Software Defined Network (SDN) controller sending a General Packet Radio Service Tunneling Protocol (GTP) request message to a first Unified Gateway (UGW), and instructing the first UGW to send the GTP request message to another GTP endpoint in a GTP user plane signaling format; and
the SDN controller receiving a GTP response message from the first UGW, and detecting the data link between the first UGW and the another GTP endpoint according to the GTP response message, wherein the GTP response message corresponds to the GTP request message;
wherein in the case where the another GTP endpoint is a second UGW, the GTP response message is generated by the SDN controller according to the GTP request message which is borne on a Packet-in message of the OPENFLOW protocol and is forwarded by the second UGW, and is sent to the SDN controller via the second UGW and the first UGW; and in the case where the another GTP endpoint is a traditional GTP endpoint, the GTP response message is generated by the traditional GTP endpoint according to the GTP request message, and is sent to the SDN controller via the first UGW.

2. The method according to claim 1, wherein the SDN controller sending the GTP request message to the first UGW, and instructing the first UGW to send the GTP request message to the another GTP endpoint in the GTP user plane signaling format comprises:
the SDN controller sending a Packet-out message of an OPENFLOW protocol to the first UGW, the GTP request message being borne on the Packet-out message; and
the SDN controller instructing, via the Packet-out message, the first UGW to send the GTP request message to the another GTP endpoint in the GTP user plane signaling format.

3. The method according to claim 2, wherein
based on that the GTP request message and/or the GTP response message are/is sent by the SDN controller to the first UGW, the GTP request message and/or the GTP response message are/is borne on a Packet-out message of an OpenFlow protocol, and based on that the GTP request message and/or the GTP response message are/is sent by the first UGW to the SDN controller, the GTP request message and/or the GTP response message are/is borne on a Packet-in message; and/or
the GTP request message and/or the GTP response message are/is transmitted in the GTP user plane signaling format when the GTP request message and/or the GTP response message are/is transmitted between the first UGW and the another GTP endpoint.

4. The method according to claim 2, wherein the GTP request message generated by the SDN controller is generated according to context information of a GTP user plane; and the GTP response message generated by the SDN controller is generated according to the GTP request message and the context information of a GTP user plane.

5. The method according to claim 2, wherein, in the case where the another GTP endpoint is a second UGW, the method further comprises:
the SDN controller sending a second GTP request message to the second UGW, and instructing the second UGW to send the second GTP request message to the first UGW in a GTP user plane signaling format; and
the SDN controller receiving a second GTP response message from the second UGW, and detecting the data link between the first UGW and the another GTP endpoint according to the second GTP response message, wherein the second GTP response message corresponds to the second GTP request message.

6. The method according to claim 1, wherein the GTP response message is sent in the GTP user plane signaling format when being forwarded to the first UGW via the second UGW or being sent to the first UGW by the traditional GTP endpoint.

7. The method according to claim 1, wherein the SDN controller detecting the data link between the first UGW and the another GTP endpoint according to the GTP response message comprises at least one of the following:
within a pre-set time threshold, based on that the SDN controller has received the GTP response message, determining that the data link between the first UGW and the another GTP endpoint is normal; and
within a pre-set time threshold, based on that the SDN controller has not received the GTP response message and the GTP response message has not yet been received after the SDN controller performs a pre-set number of retry operations, determining that the data link between the first UGW and the another GTP endpoint is abnormal.

8. The method according to claim 1, wherein
based on that the GTP request message and/or the GTP response message are/is sent by the SDN controller to the first UGW, the GTP request message and/or the GTP response message are/is borne on a Packet-out message of an OpenFlow protocol, and based on that the GTP request message and/or the GTP response message are/is sent by the first UGW to the SDN controller, the GTP request message and/or the GTP response message are/is borne on a Packet-in message; and/or
the GTP request message and/or the GTP response message are/is transmitted in the GTP user plane signaling format when the GTP request message and/or the GTP response message are/is transmitted between the first UGW and the another GTP endpoint.

9. The method according to claim 8, wherein the GTP user plane signaling is an echo request message and/or echo response message in a standard GTP format.

10. The method according to claim 1, wherein the GTP request message generated by the SDN controller is generated according to context information of a GTP user plane; and the GTP response message generated by the SDN controller is generated according to the GTP request message and the context information of a GTP user plane.

11. The method according to claim 1, wherein, in the case where the another GTP endpoint is a second UGW, the method further comprises:
the SDN controller sending a second GTP request message to the second UGW, and instructing the second UGW to send the second GTP request message to the first UGW in a GTP user plane signaling format; and
the SDN controller receiving a second GTP response message from the second UGW, and detecting the data link between the first UGW and the another GTP endpoint according to the second GTP response message, wherein the second GTP response message corresponds to the second GTP request message.

12. A method for detecting a data link, comprising:
a first Unified Gateway (UGW) receiving a General Packet Radio Service Tunneling Protocol (GTP) request message sent from a Software Defined Network (SDN) controller; and
the first UGW sending the GTP request message to another GTP endpoint in a GTP user plane signaling format according to an instruction of the SDN controller, and forwarding a GTP response message to the SDN controller, wherein the GTP response message corresponds to the GTP request message and is used for detecting the data link between the first UGW and the another GTP endpoint;
wherein in the case where the another GTP endpoint is a second UGW, the GTP response message is generated by the SDN controller according to the GTP request message which is borne on a Packet-in message of an OPENFLOW protocol and is forwarded by the second UGW, and is sent to the SDN controller via the second UGW and the first UGW; and in the case where the another GTP endpoint is a traditional GTP endpoint, the GTP response message is generated by the traditional GTP endpoint according to the GTP response message, and is sent to the SDN controller via the first UGW.

13. The method according to claim 12, wherein
based on that the GTP request message and/or the GTP response message are/is sent by the SDN controller to the first UGW, the GTP request message and/or the GTP response message are/is borne on a Packet-out message of an OPENFLOW protocol, and based on that the GTP request message and/or the GTP response message are/is sent by the first UGW to the SDN controller, the GTP request message and/or the GTP response message are/is borne on a Packet-in message; and/or
the GTP request message and/or the GTP response message are/is transmitted in the GTP user plane signaling format when the GTP request message and/or the GTP response message are/is transmitted between the first UGW and the another GTP endpoint.

14. The method according to claim 13, wherein the GTP user plane signaling is an echo request message and/or echo response message in a standard GTP format.

15. The method according to claim 12, wherein the GTP request message generated by the SDN controller is generated according to context information of a GTP user plane; and the GTP response message generated by the SDN controller is generated according to the GTP request message and context information of a GTP user plane.

16. A device for detecting a data link, comprising:
a sending component configured to send a General Packet Radio Service Tunnelling Protocol (GTP) request message to a first Unified Gateway (UGW), and instruct the first UGW to send the GTP request message to another GTP endpoint in a GTP user plane signaling format; and
a detection component configured to receive a GTP response message from the first UGW, and detect the data link between the first UGW and the another GTP endpoint according to the GTP response message, wherein the GTP response message corresponds to the GTP request message;
wherein in the case where the another GTP endpoint is a second UGW, the GTP response message is generated by the SDN controller according to the GTP request message which is borne on a Packet-in message of the OPENFLOW protocol and is forwarded by the second UGW, and is sent to the SDN controller via the second UGW and the first UGW; and in the case where the another GTP endpoint is a traditional GTP endpoint, the GTP response message is generated by the traditional GTP endpoint according to the GTP request message, and is sent to the SDN controller via the first UGW.

17. A device for detecting a data link, comprising:
a receiving component configured to receive a General Packet Radio Service Tunnelling Protocol (GTP) request message sent from a Software Defined Network (SDN) controller; and
a forwarding component configured to send the GTP request message to another GTP endpoint in a GTP user plane signaling format according to an instruction from the SDN controller, and send a GTP response message to the SDN controller, wherein the GTP response message corresponds to the GTP request message and is used for detecting the data link between the first UGW and the another GTP endpoint;
wherein in the case where the another GTP endpoint is a second UGW, the GTP response message is generated by the SDN controller according to the GTP request message which is borne on a Packet-in message of an OPENFLOW protocol and is forwarded by the second UGW, and is sent to the SDN controller via the second UGW and the first UGW; and in the case where the another GTP endpoint is a traditional GTP endpoint, the GTP response message is generated by the traditional GTP endpoint according to the GTP response message, and is sent to the SDN controller via the first UGW.

* * * * *